United States Patent
Ophir et al.

(10) Patent No.: US 7,866,179 B2
(45) Date of Patent: Jan. 11, 2011

(54) COMPACT HEAT PUMP USING WATER AS REFRIGERANT

(75) Inventors: Avraham Ophir, Herzliya (IL); Henrikh Rojanskiy, Or Arkiva (IL); Rafi Siluk, Matan (IL); Arie Kanievski, Kfar Saba (IL); Larisa Kanievski, legal representative, Kfar Saba (IL)

(73) Assignee: I.D.E. Technologies Ltd., Kadima (IL)

( * ) Notice: Subject to any disclaimer, the term of this patent is extended or adjusted under 35 U.S.C. 154(b) by 231 days.

(21) Appl. No.: 11/884,758

(22) PCT Filed: Feb. 23, 2006

(86) PCT No.: PCT/IL2006/000248

§ 371 (c)(1),
(2), (4) Date: Jun. 10, 2008

(87) PCT Pub. No.: WO2006/090387

PCT Pub. Date: Aug. 31, 2006

(65) Prior Publication Data

US 2009/0100857 A1   Apr. 23, 2009

Related U.S. Application Data

(60) Provisional application No. 60/654,959, filed on Feb. 23, 2005, provisional application No. 60/654,960, filed on Feb. 23, 2005.

(51) Int. Cl.
*F25B 19/00* (2006.01)
(52) U.S. Cl. ......................................... 62/268; 62/100
(58) Field of Classification Search .................. 62/100, 62/268, 270

See application file for complete search history.

(56) References Cited

U.S. PATENT DOCUMENTS

| | | | |
|---|---|---|---|
| 3,255,603 A | 6/1966 | Johnson et al. | |
| 3,342,039 A | 9/1967 | Bridge et al. | |
| 3,443,393 A | 5/1969 | Goldberg | |
| 4,380,353 A * | 4/1983 | Campbell et al. | ............. 299/12 |
| 5,520,008 A | 5/1996 | Ophir et al. | |
| 6,688,117 B1 | 2/2004 | Ophir | |

FOREIGN PATENT DOCUMENTS

| | | |
|---|---|---|
| CN | 2227811 Y | 5/1996 |
| CN | 2506961 Y | 8/2002 |
| DE | 30 18 918 A1 | 12/1981 |

* cited by examiner

*Primary Examiner*—William E Tapolcai
(74) *Attorney, Agent, or Firm*—Dvorah Graeser (57) ABSTRACT

Disclosed is a compact heat pump using water as refrigerant, including a casing having a first and second end sections and an intermediate section located therebetween, with an evaporator located at the first end section, configured for containing said water and allowing evaporation of at least a part of the water to produce vapor and remove heat from the remainder of the water. At least one agitator scoop is located within said evaporator, with one or more demisters installed between the evaporator and the compressor. The one or more compressors induce evaporation by maintaining vacuum at least at an intake conduit, and are configured for receiving the vapor through the intake conduit after passing through a heated demister. The condenser is configured for receiving the compressed vapor from the compressor, lowering the vapor temperature and condensing it back into a liquid state.

16 Claims, 6 Drawing Sheets

COMPACT HEAT PUMP USING WATER AS REFRIGERANT

CROSS-REFERENCE

This is a National Phase Application filed under 35 U.S.C. 371 of International Application No. PCT/IL2006/000248, filed on Feb. 23, 2006, claiming the benefit under 35 USC 119(e) of U.S. Provisional Patent Application No. 60/654,959, filed on Feb. 23, 2005 and claiming the benefit under 35 USC 119(e) of U.S. Provisional Patent Application No. 60/654,960, filed on Feb. 23, 2005, the entire content of each of which is hereby incorporated by reference in its entirety.

FIELD OF THE INVENTION

This invention relates to vacuum heat pumps, in particular those that use water as refrigerant.

BACKGROUND OF THE INVENTION

A heat pump is a mechanism designed to displace a certain amount of heat energy from a low temperature environment to a high temperature environment by applying work to the refrigerant.

A heat pump may work in an open or closed cycle. In a closed cycle, the pump's functional components form a closed loop through which the refrigerant is cycled over and over again, and in the course of which heat is taken away or given to the refrigerant, respectively heating or cooling the environment outside the heat pump. In open cycle heat pumps, the components are normally arranged along a line for the refrigerant to be driven through the components until it exits the system all together, thereby removing heat from the refrigerant at one end of the line and releasing it at the other end. This kind of cycle requires a constant feed of new refrigerant on one end, and extraction of transformed refrigerant on the other end.

A vacuum heat pump usually comprises an evaporator adapted to accommodate a liquid refrigerant to be evaporated therefrom, a compressor adapted to induce the evaporation and compress the vapor, and a condenser adapted to transform the vapor coming from the compressor back into a liquid state. In such a heat pump, a compressor or an ejector is responsible for maintaining the vacuum needed to induce evaporation. As a result, a part of the refrigerant in the evaporator evaporates, much like sweat from our body, removing heat from the remainder of the refrigerant, and the evaporated refrigerant is normally condensed in the condenser so that both the cooled refrigerant that remains in the evaporator, and the condensate, may be used for a variety of implementations.

One vacuum heat pump of this kind is disclosed in the Applicant's U.S. Pat. No. 6,688,117.

SUMMARY OF THE INVENTION

According to one aspect of the present invention there is provided a compact heat pump using water as refrigerant, comprising:

a casing having a first and a second end section and an intermediate section located therebetween;
 an evaporator located at the first end section, adapted to accommodate said water and allow evaporation of at least a part of it to produce vapor, thereby removing heat from the remainder of said water;
 at least one compressor located at the second end section for receiving said vapor through an intake conduit extending from said evaporator to said compressor, and compressing said vapor, the compressor being adapted to induce said evaporation by maintaining vacuum at least at said intake conduit;
 a condenser adapted for receiving the vapor from said compressor, lowering its temperature thus condensing it back into a liquid state; and
 means allowing to create and maintain vacuum in said casing;
 wherein said condenser is located in said intermediate section and said intake conduit passes therethough.

Due to the unique arrangement of the heat pump elements within the casing of the vacuum heat pump according to the present aspect of the invention, the intermediate section of the casing otherwise wasted, is utilized to accommodate the condenser, which allows for minimizing the overall size of the heat pump while maximizing the heat and mass transfer surfaces, as well as offering supreme heat and mass transfer coefficients.

The evaporator is based on a direct contact evaporation mechanism which may be in the form of agitator scoops adapted to spray the water therein, extended plate surfaces sprayed with the water, or the like, adapted for increasing the evaporation surface area The evaporator may also be adapted to receive feed water and discharge product water in the form of chilled water or ice slurry through appropriate respective inflow and outflow openings. Due to the fact that the evaporator is of a direct contact type, i.e. the water serves both as refrigerant and the product, the heat transfer process is highly efficient. Furthermore, when the product is in the form of ice slurry, the absence of intermediate heat transfer surfaces between the refrigerant and the product prevents the freezing of water on such surfaces, which would normally lower the efficiency of the overall heat transfer.

The compressor may be a centrifugal or axial flow compressor. One or more compressors may be mounted together on a single mutual shaft allowing a higher temperature lift. Thus, if for example two compressors are used, a first compressor is adapted to displace said vapor into the second compressor which is in turn adapted for further compressing of the vapor and its discharge into the condenser. In this case, the second end section may be fitted with an inflow pipe adapted to deliver de-superheated water to the second compressor for more efficient compression. Since the compressor discharges the vapor straight into the condenser, the head losses usually created by a connecting pipe are eliminated.

Said condenser may comprise a packing having a large surface area and means for applying a coolant thereon. Such a packing may be located around said intake conduit. The condenser may also be adapted to receive such a coolant from a pipe connected thereto. It may also be adapted to allow both the condensed vapor and the coolant to flow into a sump storage space, positioned at the end of said intermediate section adjacent to said first end section of the casing. The sump storage space may be fitted with an outflow opening adapted to receive a pipe for pumping out the water accumulated therein.

The intake conduit may be of any appropriate design. For example, it may be advantageous for the intake conduit to have a wide end merging with the circumference of the evaporator, a narrow end adjacent to said compressor, and a straight narrow portion therebetween. Such a design may allow flow stabilization of the vapor entering the compressor. The intake conduit's wide end may be fitted with one or more demisters which are adapted for preventing droplet carryover into the compressor by filtering out water droplets that are over a certain size. This size is normally determined by the anticipated damage that might be inflicted upon the compressor should the droplets impact its blades. The demister may be of the louver type, woven mesh type or the like and may be connected to a heating mechanism for higher efficiency. External surface of the intake conduit facing the condenser may be shaped to form with the casing said sump storage space.

According to one embodiment of the invention, the heat pump may be designed for use in a vertical orientation such that the second end section is located above the intermediate and first end sections, the latter serving as a pool for the refrigerant. In this case, droplet carryover to the compressor may be largely prevented since most of the droplets are pulled back into the evaporator simply by gravity, allowing optional elimination of the demister. Furthermore, such an orientation allows the provision of a uniform vapor flow into the compressor through the intake conduit, raising the efficiency of the compressor. This advantage may be further emphasized if the heat pump is designed to have an axial symmetry around a vertical axis extending between the first and second ends.

The heat pump may be operated in a closed or open cycle. Possible applications of the heat pump include, but are not limited to, its use as a compact water chiller, a compact ice-slurry maker, or a part of a water desalination installation, a part of a snow making or ice production facility, a combination of two or more of these applications or the like. For some of these implementations, any of the sections of the heat pump may be modified, as deemed necessary.

If the heat pump is used for producing slurry for snow making, it may constitute a part of a snow dome for indoor skiing and leisure activities, said dome comprising a slope adapted for dispersion of said slurry thereon and a water withdrawal facility adapted to withdraw water from said slurry, to allow leaving wet snow on top of said slope for skiing thereon, dome comprising a plurality of dispersion valves adapted for dispersion of said slurry onto said slope and a slurry feed line adapted to introduce the slurry into said valves; said facility comprising a set of drainage channels adapted for draining water out of said slurry or wet snow, and a plurality of barriers disposed along the slope and adapted for impeding the water from said slurry and diverting it into said channels, thereby preventing flooding of the slope by the slurry water during dispersion of the slurry, and maintaining a low water level beneath the snowed slope by constant drainage of snow-melt water. Said snow dome may also comprise one or more screens adapted to be positioned on said slope in a removable manner for piling up of said snow.

A snow dome as described above constitutes another aspect of the present invention.

The water withdrawal facility in the snow dome may also be useful to withdraw snow-melt water from the slope. It may also comprise a storage tank in fluid communication with the drainage channels adapted to collect water withdrawn from the slope. This tank may also be connected to inlet/s of one or more slurry producing heat pumps, to produce slurry from the withdrawn water.

The angle of the slope may vary from dome to dome and may even be adjustable to suit the user's needs. The barriers may be of various forms, e.g. angular, semi-circular, straight etc.

With the design of the snow dome as described above, snow thereon is allowed to melt and, subsequently, snow-melt water may be fed back into the slurry production facility, making the refrigeration of the dome not obligatory as opposed to known facilities, whereby full indoor skiing and snow related activity in above zero degrees centigrade is made possible. The environment of the snow dome is naturally refrigerated by the meltdown of the snow dispersed on the slope. It should also be noted that the dome may be further refrigerated should this be desired, and even divert a portion of said snow-melt water for that particular purpose.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EXEMPLARY EMBODIMENTS

Figure 1:
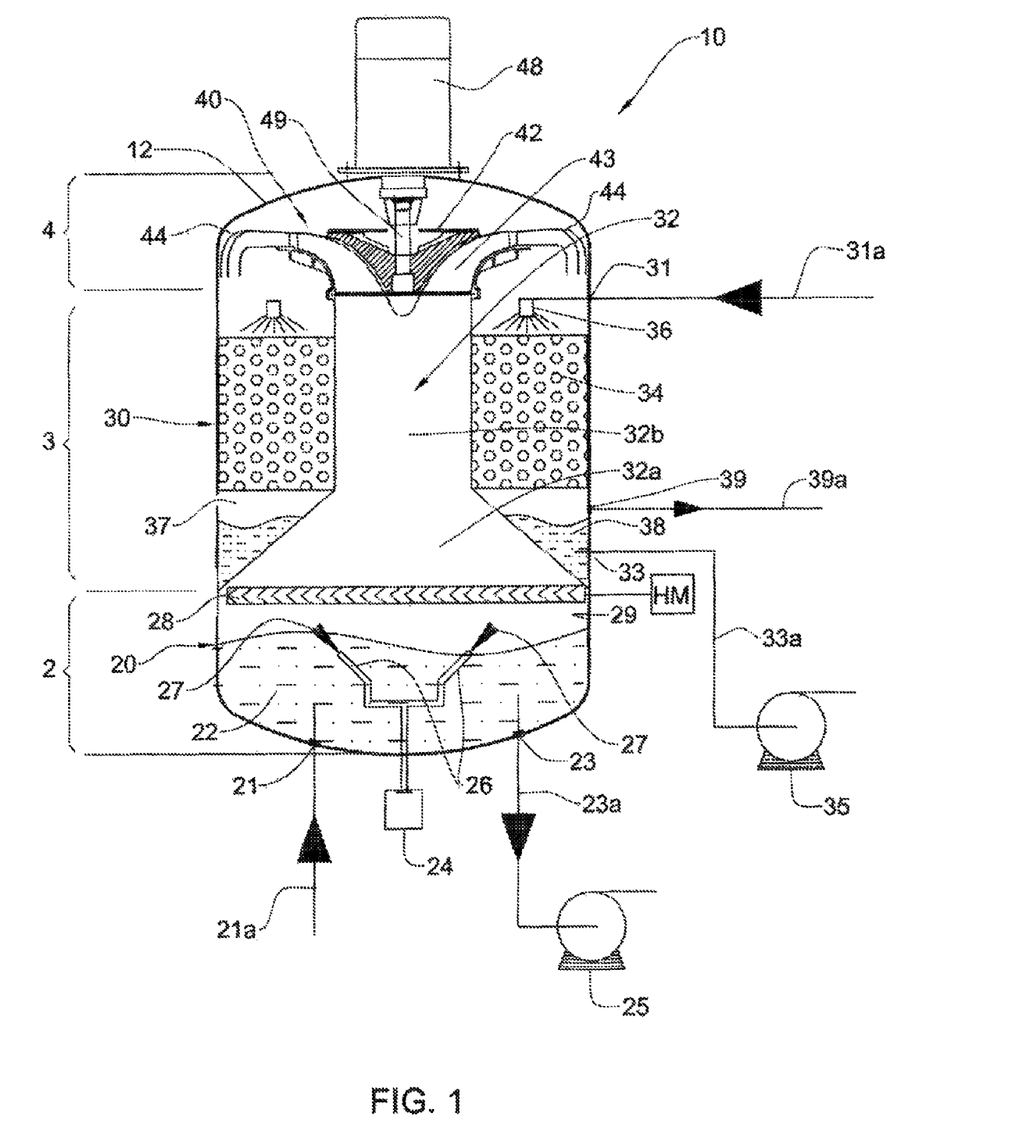
FIG. 1 is a schematic cross-sectional view of a heat pump designed for the production of ice slurry, in accordance with one embodiment of the first aspect of the invention.

Attention is first drawn to FIG. 1, where there is shown a schematic cross-sectional view of a vertically positioned heat pump (10), adapted for production of ice slurry. The heat pump comprises a casing (12) with a lower end section (2), an upper end section (4) and an intermediate section (3).

The evaporator (20) is located at the bottom end section (2) and is in the form of a cavity adapted to accommodate a certain amount of water (22), having a water inlet (21) and an ice slurry outlet (23). The evaporator further comprises a set of scoops for agitation (26) adapted to be powered by a motor (24) located outside the casing (12), and an optional demister (28) located above the water (22) level adapted for filtering water droplets over a certain size from the water vapor passing therethrough.

The upper end section (4) houses a compressor (40) having a rotor (42), and compressor blades (43) mounted on a main shaft (49) adapted to be powered by a motor (48) located outside the casing (12). The compressor is in fluid communication with the evaporator via an intake conduit (32) and is designed for maintaining vacuum within the evaporator (20) and the intake conduit (32). The intake conduit (32) comprises a wide conical portion (32a) with a first end merged with the circumference of the evaporator (20), and a narrow straight portion (32b) with a second end adjacent and leading to the compressor (40). The compressor further comprises at least one diffuser channel (44).

The intermediate section (3) of the heat pump (10) includes a condenser (30) and compressor intake conduit (32) passing therethrough, allowing fluid communication between the evaporator (20) and compressor (40). On the outside perimeter of the intake conduit (32) is a condenser (30), comprising a large surface area packing (34) adapted to increase heat transfer between a vapor and a coolant, a coolant distribution mechanism (36) adapted to spray said coolant on top of said packing (34), and a coolant inflow opening (31) adapted to be connected to a feed line (31a), supplying the condenser with the coolant. The condenser further comprises one or more vacuum means (39) adapted to be connected through outflow line (39a) to vacuum pumps (not shown) designed for creating an initial vacuum within the casing (12) prior to operation of the heat pump (10), and for the removal of non-condensable gasses from the condenser (30).

In addition, the condenser (30) comprises a sump storage space (37) formed by the conical shape portion (32a) of the intake conduit (32) and the casing (12) wall. The sump space comprises an outflow opening (33), adapted to be connected to an outflow line (33a) which is, in turn, connected to a pump (35), both line and pump adapted for removing the accumulated water sump (38) from the sump storage space (37). The sump may be used for a number of implementations like a source for distilled water or the like. Alternatively, the sump (38) may be removed all together to an external reservoir.

Prior to operation of the heat pump (10), the air within the casing (12) is removed through the vacuum means (39) and outflow line (39a), and the pressure within the casing (12) is lowered to near vacuum. Subsequently, the compressor (40) commences its operation, maintaining a state of vacuum within the space of the evaporator (20) and intake conduit (32), inducing evaporation of water from the evaporator (20).

The agitator scoops (26) of the evaporator (20) spray the water (22) on to the evaporator walls (29) creating a larger surface area for evaporation. The vapor (not shown) created by evaporation of water from the evaporator walls (29) and pool surface is being displaced in an upward direction into the conical portion (32a) of the intake conduit (32) due to the suction of the compressor (40). Most of the water droplets entrained in the vapor updraft are pulled back down into the water (22) in the evaporator pool simply by gravity whereas the remainder of the droplets are trapped by the demister (28). After passing the demister (28), the vapor passes through both wide conical (32a) and straight narrow (32b) portions of the intake conduit (32) and reaches the compressor (40).

When the vapor reaches the compressor (40), the vapor is compressed and displaced through the diffuser channels (44) into the condenser (30) in a downward direction towards the condenser packing (34). At the same time, a coolant (not shown) is provided through feed line (31a) and distributed through the distribution mechanism (36) onto the packing (34) as well. As a result, a heat transfer process takes place between the coolant and the vapor in which the vapor cools down and condenses while transferring heat to the coolant. After this heat transfer, the condensed water and coolant drip down forming a sump (38) accumulated in the sump storage space (37). The heat pump (35) draws the sump (38) through outflow line (33a) outside the casing (12) where some of the sump (38) may be reused, after it is cooled by cooling means (not shown) and redirected back to feed line (21a), some of the sump may be returned through an optional overflow mechanism (not shown).

As a result of the process, heat is taken away from the water (22), transforming part of the water (22) into an ice slurry. The slurry is pumped away from the evaporator (20) through an outflow line (23a) using a slurry pump (25). Since the process is continuous, water and coolant are constantly being pumped into evaporator and condenser (20; 30) through feed lines (21a; 31a) respectively, and sump (38) is constantly being pumped out of the sump space (37) through outflow line (33a).

Non-condensable gasses as well as the remainder of compressed vapor that has not condensed are pumped out through vacuum means (39) in the condenser (30). The NCG (Non-Condensable Gasses) and vapor are directed outside the heat pump (10) and may be also used for a variety of implementations.

Figure 2:
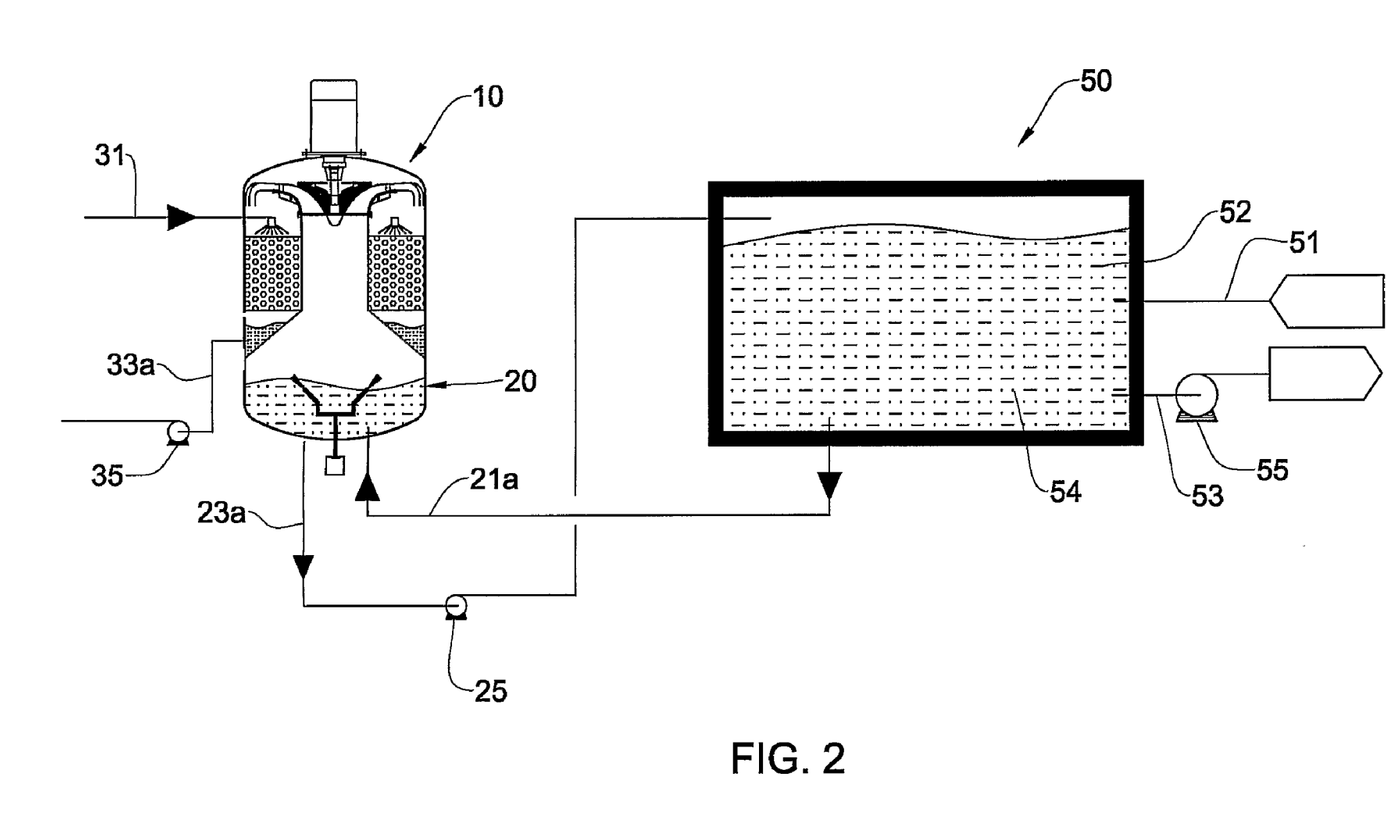
FIG. 2 is a schematic cross-sectional view of the heat pump shown in FIG. 1 used with an ice slurry tank.

FIG. 2 Illustrates the use of the heat pump (10) with an ice slurry tank (50) adapted to be used as a low temperature reservoir. The outflow line (23a) withdraws ice slurry from the evaporator (20) and feeds it into the ice slurry tank (50) on its top side. When the slurry has been introduced into the tank (50), the cold water (54) from the slurry sink down to the bottom of the tank (50) causing the reduced ice slurry (52) to float on top of it.

The low temperature reservoir may be used in a number of applications, for example, in conjunction with an air conditioning unit or system (not shown) whereby the inflow (51) and outflow (53) lines, and the pump (55) are used for circulation of cold water between the tank (50) and the air conditioning system. Due to the use of ice slurry (54), the tank (50) required to store the low temperature medium, i.e. ice slurry, requires much less space than in common systems using only cold water.

Figure 3:
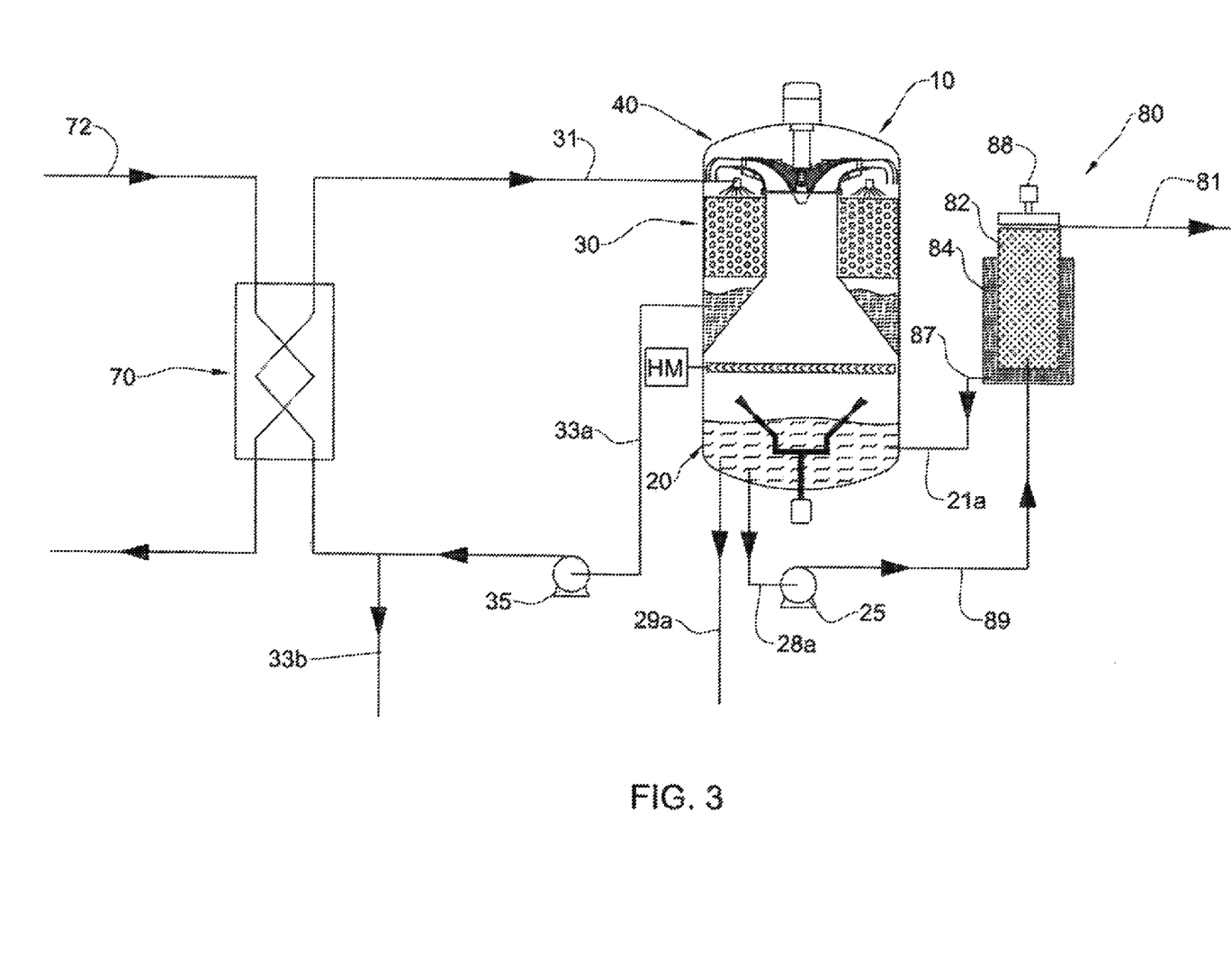
FIG. 3 is a schematic cross-sectional view of the heat pump of FIG. 1 used for water desalination.

Another implementation of the heat pump (10) is shown in FIG. 3, where the heat pump is used for the purpose of water distillation in conjunction with an ice separator (80), comprising an internal portion (82) and an external portion (84) each adapted to hold ice slurry of different qualities. The separator (80) is further connected to a feed line (89) connected to the bottom portion of the separator (80) and to two outflow pipes (81; 87) connected to the bottom of the external portion (84) and top of the internal portion (82) respectively. In this embodiment, a further use is also made of the sump (38) collected in the condenser (30) of the heat pump for distillation purposes.

Since the heat pump (10) in the latter embodiment works essentially the same as in the previous embodiments, only its operation and connection to the external elements (70; 80) will be described:

In operation, the ice slurry withdrawn from the evaporator (20) through outflow line (23a) is being pumped through feed line (89) using pump (25) into the internal portion (82) of the ice separator (80) where a separation of the water from the ice slurry takes place, leaving a water reduced ice slurry at the top of the internal portion (82) of the separator (80). The water sinking down to the bottom of the external portion (82) is withdrawn using outflow line (87) into feed line (21a) of the heat pump (10). The water reduced ice slurry received at the top of the internal portion (82) is being carried away using outflow line (81) to be used for various implementations.

The sump (38) accumulated in the sump storage space (37) is withdrawn using outflow pipe (33a) and is pumped into feed line (31a) using a pump (35). However, a certain amount of sump is being redirected to an outflow line (33b) as distilled water intended for various purposes. The remainder of the sump is carried through the line (31a) where it undergoes heat transfer in a heat exchanger (70) using a line (72). The heat exchanger (70) is also used as a buffer for water purification resulting in cool clean water which is moved through line (31a) to enter the condenser (30) as the condenser coolant.

Figure 4:
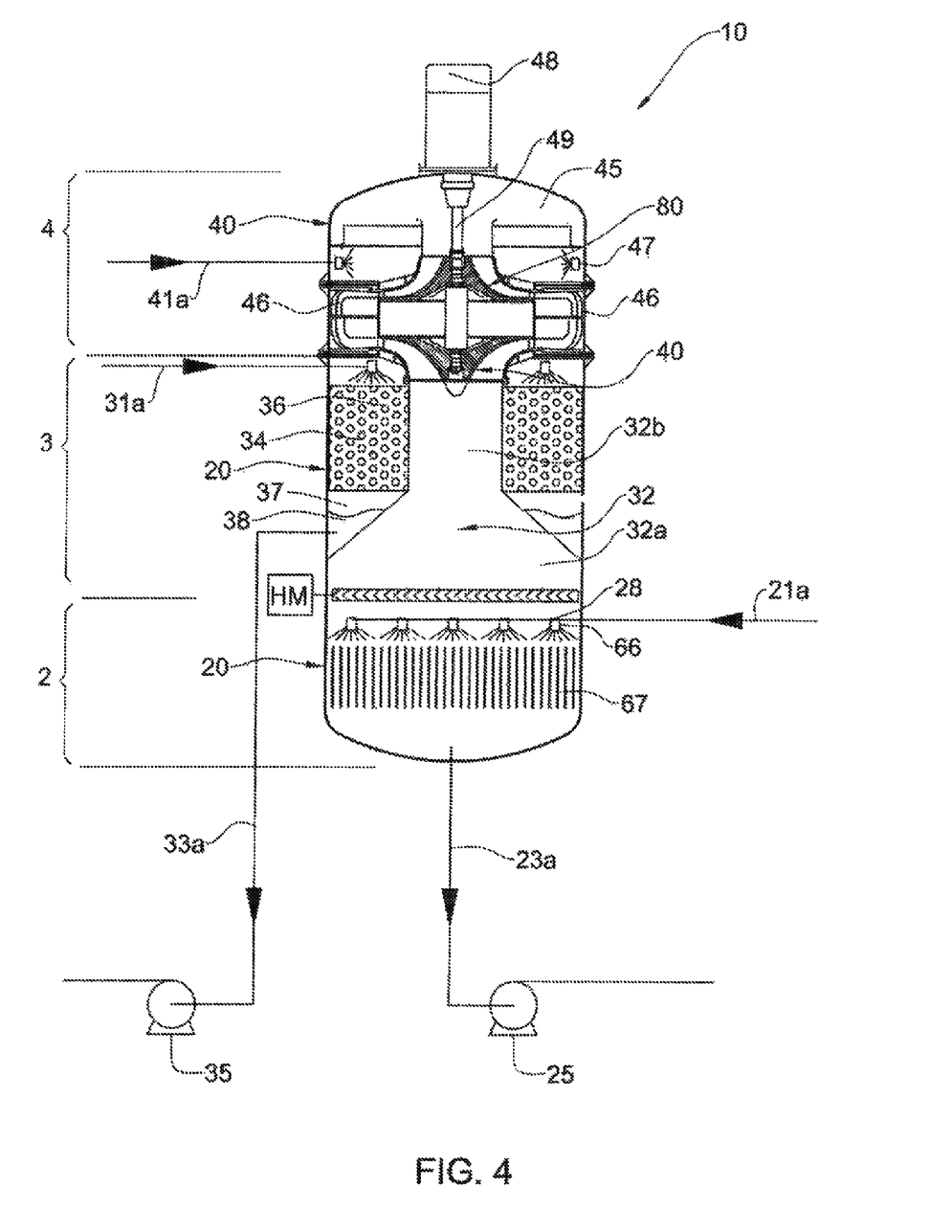
FIG. 4 is a schematic cross-sectional view of the heat pump of FIG. 1 modified for supply of chilled water, in accordance with another embodiment of the first aspect of the invention.

Another embodiment of the heat pump (10) is shown in FIG. 4, where the heat pump (10) is used as a chiller and has a modified evaporator and an enlarged upper end section (4). In this embodiment, the evaporator comprises a set of plates (67) having a large surface area and a set of sprinklers (66) connected to a feed line (21a). In operation, the water from the feed line (21a) is sprayed over the plates (67), allowing evaporation of the water. From the evaporator (20), vapor moves in an upward direction through the intake conduit (32) until it reaches the compressor (30).

The upper end section (4) is shown containing a de-superheating chamber (45) housing a second compressor (80), which may be similar to the original compressor (40). Both compressors (40; 80) are mounted on a single shaft (49). An additional feed line (41a) is connected to the de-superheating chamber (45) adapted to supply de-superheated water into said chamber using a distribution mechanism (47).

In such an embodiment the compressors (40; 80) are connected such that in operation, the first compressor (40) directs the vapor upwards towards the second compressor (80) as opposed to the previous embodiment where the vapor was directed to the condenser (30). The second compressor (80) further compresses the vapor and directs it into the condenser (30) where the process continues much like in the first embodiment. The addition of the compressor (80) to the heat pump (10) allows for a higher temperature lifts of the water (22) within the heat pump (10).

Figure 5:
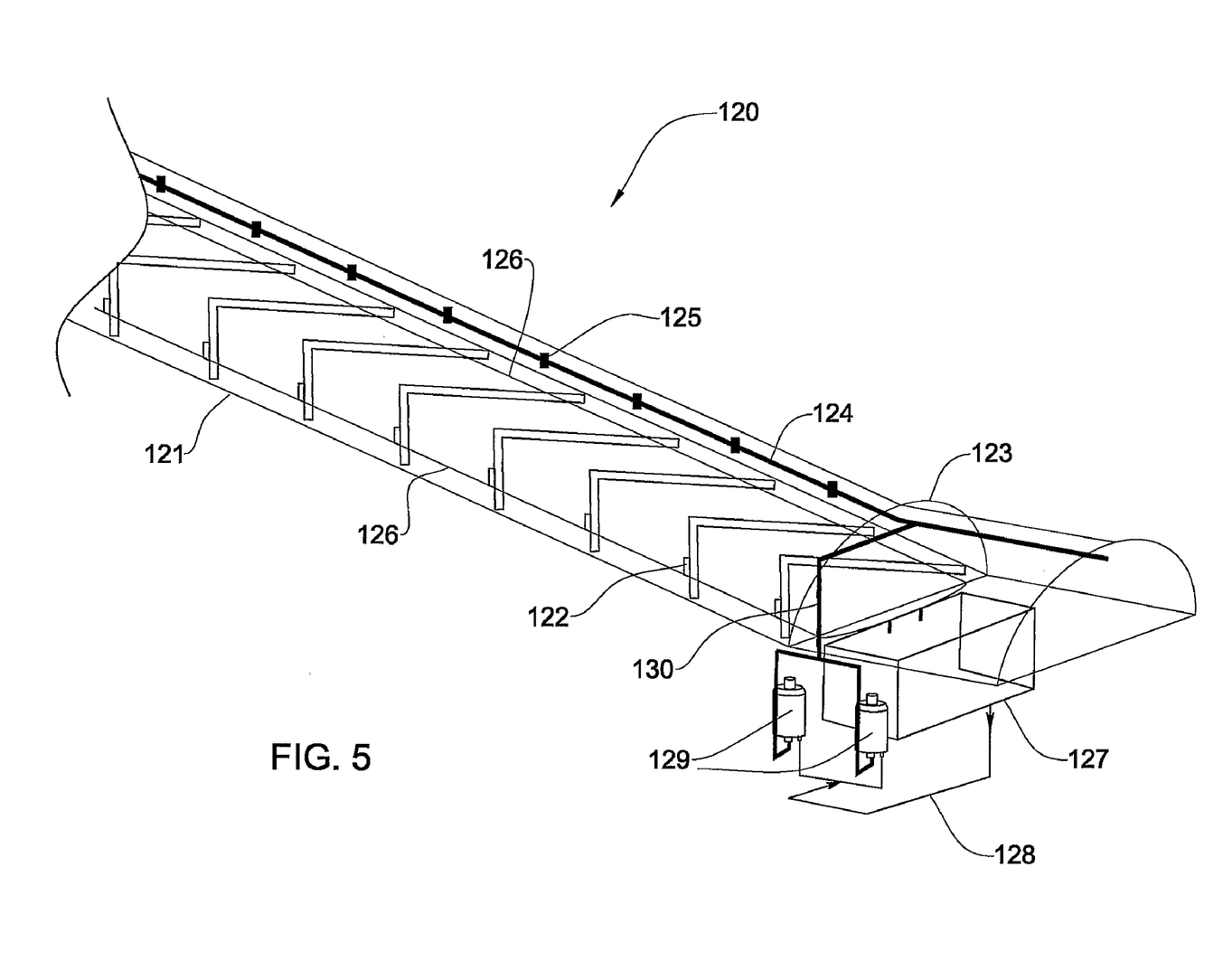
FIG. 5 is a schematic view of a snow dome for indoor skiing in accordance with another aspect of the invention.

In FIG. 5 a snow dome (120) is shown of the kind where a heat pump according to the first aspect of the invention or another heat pump may be used, comprising a slope (121) having a plurality of barriers (122) disposed along it, a roof (123) supporting a slurry feed line (124), a plurality of dispersion valves (125) disposed along the feed line (124), drainage channels (126) disposed on both sides of the slope (121), a water tank (127) and two ice slurry production heat pumps (129). The heat pumps are connected to the tank (127) by a feed pipe (128) and to the feed line (124) by an outflow pipe (130).

Figure 6:
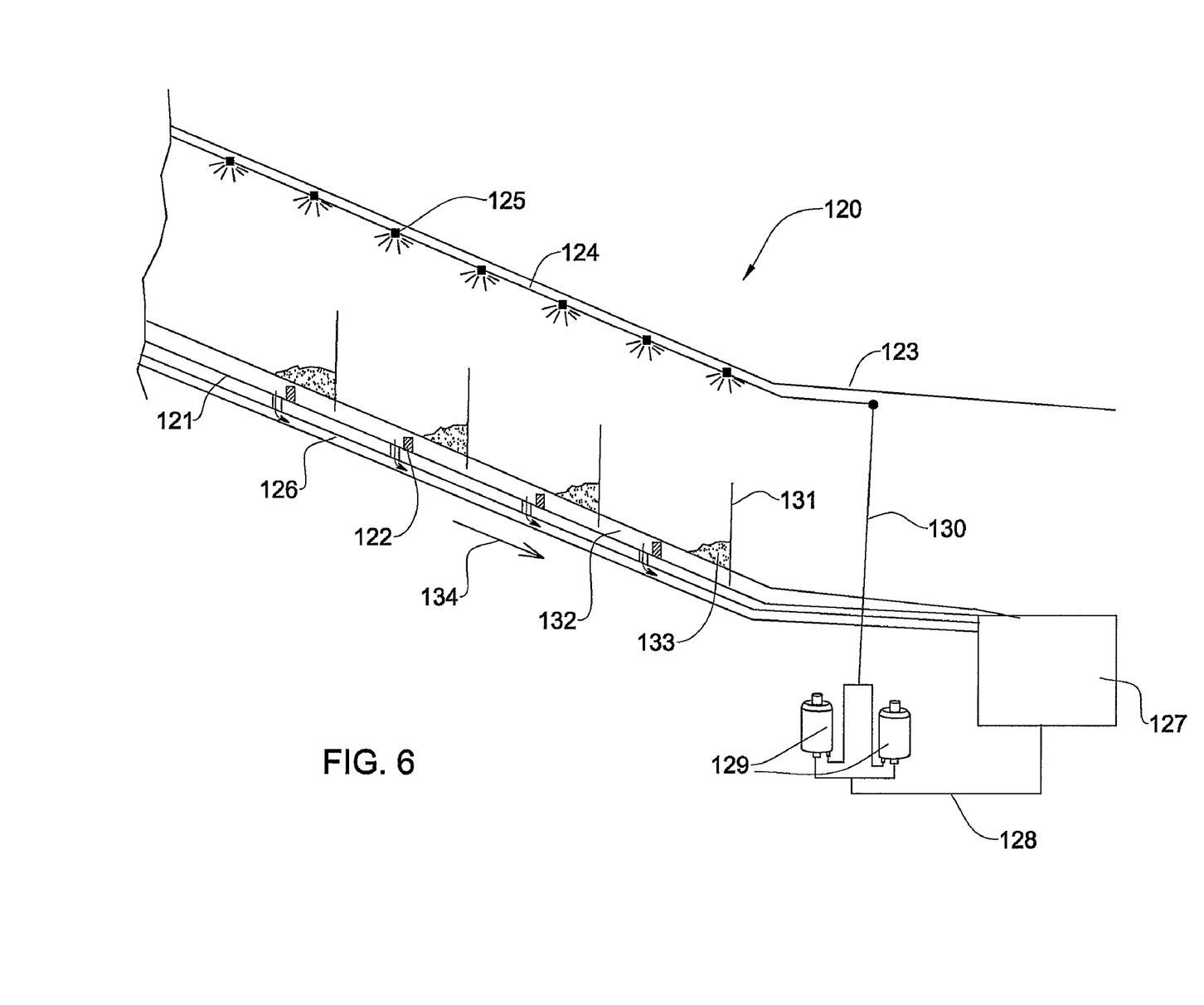
FIG. 6 is a schematic side view of the snow dome shown in FIG. 5 with erected screens.

In operation, as shown in FIG. 6, screens (131) are erected intermittently along the slope (121) prior to dispersion of ice-slurry thereon. The heat pump (129) receives feed water from the water tank (127) through line (128) and produces ice slurry containing a high level of ice crystals. The slurry is then pumped through a pipe (130) into the slurry feed line (124), and using the dispersion valves (125), is distributed onto the slope (121).

The melt water from the ice-slurry form a water layer (132) on which the slurry is free to slip in a downward direction, indicated by arrow (134). The screens (131) prevent the slurry from slipping, allowing only water (132) to drip down, resulting in the piling of wet snow (133) against the screens (131). The water (132) dripping passed the screens (131) are blocked by the barriers (122) and directed into the drainage channels (126) from which it is fed into the water tank (127).

Once the piles (133) have been formed, the screens (131) may be removed and the piles may be groomed manually or by mechanical means (not shown) to create an even layer of snow (133) on the slope (121) allowing skiing and snow related activities. During the operation of the dome (120), the snow (133) on the slope (121) is constantly melting. The snow-melt water (132) seeping down the slope (121) are blocked by the barriers (122) and directed into the drainage channels (126), thus a low water level on the slope (21) is maintained. The water from the drainage channels (126) is fed back into the water tank (127) where the entire process may repeat itself.

Since the snow (133) on top of the slope (121) is allowed to melt, skiing and snow related activities may be carried out within the dome (120) in above zero degrees centigrade, and refrigeration of the dome (120) environment is not obligatory. Furthermore, the dome (120) is naturally cooled by the latent heat taken by the snow (133) in the process of melting. Should further refrigeration of the dome (120) be desired, part of the water from the tank (127) may be diverted for such purposes. In addition, the snow dome (120) may be fitted with an air-conditioning system adapted for de-humidifying the air within the dome.

It should be noted that the screens (131) and barriers (122) may be of various shapes and form allowing the functionality as described in the above specifications, e.g. angular, semi-circular etc.

Those skilled in the art to which this invention pertains will readily appreciate that numerous changes, variations and modifications can be made without departing from the scope of the invention mutatis mutandis.

The invention claimed is:

1. A compact heat pump using water as refrigerant, comprising:
   a casing having a first end section and a second end section and an intermediate section located therebetween;
   an evaporator located at the first end section, configured for containing said water and allowing evaporation of at least a part of the water therefrom to produce vapor, thereby removing heat from the remainder of the water;
   at least one agitator scoop located within said evaporator, said scoop being used for both agitating and for spraying the water within the evaporator for increasing evaporation surface area;
   one or more demisters installed between the evaporator and the compressor, provided with a heating mechanism;
   one or more compressors located at the second end section and provided with an intake conduit extending from the evaporator to the compressor, configured to induce the evaporation by maintaining vacuum at least at the intake conduit, the compressor being further configured for receiving the vapor through the intake conduit after passing through the heated demister and compressing it;
   a condenser located in said intermediate section such that said intake conduit passes therethrough, said condenser being configured for receiving the compressed vapor from the compressor, lowering its temperature and condensing it back into a liquid state; and
   means to create and maintain vacuum in the casing.

2. The heat pump according to claim 1, wherein the heat pump is configured to operate in a vertical orientation.

3. The heat pump according to claim 1, wherein the heat pump is adapted for use as one of the following: a compact water chiller, a compact ice-slurry maker, a part of a desalination installation, and a part of a snow or ice making facility.

4. The heat pump according to claim 1, wherein the evaporator is of the direct contact type.

5. The heat pump according to claim 4, further comprising plates deployed within the evaporator adapted for being sprayed with the water for increasing evaporation.

6. The heat pump according to claim 1, wherein the compressor is of the centrifugal or axial types.

7. The heat pump according to claim 6, wherein the one or more compressors may be mounted together on a single shaft.

8. The heat pump according to claim 1, wherein the condenser comprises a packing for enlarging the condenser surface area.

9. The heat pump according to claim 1, wherein the condenser is configured to receive a coolant feed from outside the heat pump, said coolant feed being configured for performing a heat exchange process with the compressed vapor leaving the compressor.

10. The heat pump according to claim 1, wherein the condenser has a sump storage space for accumulating condensed water and coolant.

11. The heat pump according to claim 10, wherein the sump storage space is fitted with an outflow for removing the accumulated sump.

12. The heat pump according to claim 1, wherein the intake conduit includes an open end merging with the circumference of the evaporator.

13. The heat pump according to claim 1, wherein the intake conduit has a straight narrow portion between its wide and narrow ends.

14. The heat pump according to claim 1, wherein the one or more demisters are of a louver or woven mesh type.

15. The heat pump according to claim 1, wherein the heat pump constitutes a part of a snow dome complex for creation of snow therein.

16. A heat pump according to claim 9, wherein said condenser comprises a packing having a large surface area, and means for applying said coolant thereon.

* * * * *